UNITED STATES PATENT OFFICE.

FRANK J. TONE, OF NIAGARA FALLS, NEW YORK, ASSIGNOR TO THE CARBORUNDUM COMPANY, OF NIAGARA FALLS, NEW YORK, A CORPORATION OF PENNSYLVANIA.

METHOD OF TREATING ALUMINUM SILICATE.

No. 906,173.      Specification of Letters Patent.      Patented Dec. 8, 1908.

Application filed March 17, 1908. Serial No. 421,731.

*To all whom it may concern:*

Be it known that I, FRANK J. TONE, of Niagara Falls, Niagara county, New York, have invented a new and useful Method of Treating Aluminum Silicate, of which the following is a full, clear, and exact description.

The invention refers to the reduction of aluminum ores, particularly to aluminum silicate, and has for its object the production therefrom of new and useful substances containing aluminum and silicon.

Aluminum silicate is an ore of aluminum of wide occurrence and is the basis of all true clays. I have discovered that by smelting this ore in the electric furnace together with a suitable reducing agent in proper amount, it is possible to reduce the silicon without reducing the aluminum, and furthermore that by proportioning the amount of reducing agent so that it shall be insufficient to reduce all the silicon, it is possible to make a fractional reduction of the silicon to any desired amount, leaving all the alumina and part of the silica unreduced. I have also discovered that by proper regulation of temperature I am able to fuse the residuum of alumina and silica into a homogeneous material having great hardness and valuable abrasive and refractory qualities. As an example of one method of carrying out this process I take any form of aluminum silicate, such as kaolin, preferably first calcining it to drive off the combined water. I mix with the kaolin a reducing agent such as carbon, in the proportions indicated by the following equation:

(1.) 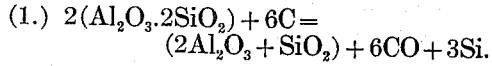

$$2(Al_2O_3.2SiO_2) + 6C = (2Al_2O_3 + SiO_2) + 6CO + 3Si.$$

When this charge is smelted in the electric furnace the carbon reduces approximately the theoretical amount of silicon oxid to silicon, and there remains alumina and silica in about the proportions of 77 per cent. alumina and 23 per cent silica. With the proper regulation of temperature these two compounds are fused into a homogeneous material, this fusion being carried out at the same time that the silicon is being reduced. By increasing the amount of carbon in the mixture it is possible to reduce a greater proportion of the silicon and leave an alumina-silica residuum having a lower content of silica than shown in equation (1) and conversely by decreasing the amount of carbon in the mixture an alumina-silica material is produced having a higher content of silica.

I have found that the reduction of the silicon is facilitated by adding to the mixture base metal or ore such as iron or manganese, which alloys with the reduced silicon. For example, using a mixture containing 1332 parts of aluminum silicate, 264 parts of carbon and 616 parts of iron, in accordance with the following equation:

(2.) 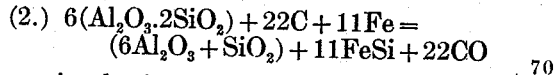

$$6(Al_2O_3.2SiO_2) + 22C + 11Fe = (6Al_2O_3 + SiO_2) + 11FeSi + 22CO$$

there is obtained an iron silicid having a content of 33 per cent. silicon and a fused residuum of alumina and silica containing about 9 per cent. of silica.

Any ordinary form of arc furnace with vertical electrodes depending into the furnace pot or chamber is suitable for carrying out this process. The charge mixture is fed into the furnace around the electrodes, and as the finished product accumulates and builds up under the arc the electrodes are raised to allow the finished product to form a pig or ingot of considerable size. After a sufficient amount of mixture has been smelted to form an ingot of a size convenient to handle, the furnace run is stopped and the fused mass is allowed to cool. The iron silicid being heavier than the alumina-silica material, has a tendency to settle to the bottom of the furnace from which it may be tapped at intervals during the run. By carrying the temperature sufficiently high, it is possible also to tap out the alumina-silica material together with the iron silicid, and by adding fresh charge from time to time to carry on the process substantially continuously. When the two materials are tapped out together the iron silicid settles in the bottom of the ladle and, after cooling is easily separated from the alumina-silica material. Small portions of the silicon alloy scattered through the fused material may be separated therefrom by concentration, after the latter is crushed. The separation may also be facilitated during the crushing if the silicon and base metal are combined in the alloy in proper proportion to form a disintegrating alloy. I have found that by taking the base metalliferous material as manganese or manganese ore, in proportions to form a silicid containing 45 to 55 per cent. manganese, the alloy is friable and on exposure to air tends to disintegrate into a fine powder. An iron silicid containing 35 per cent. iron is of similar character. Other disintegrating alloys may be produced in similar manner and for the same purpose of facilitating separation of finished products.

The silicids produced in this process are useful for various purposes such as the refining of iron and steel. The fused alumina-silica material has a hardness equal to many grades of corundum, and is very tough. It is therefore valuable as an abrasive. It is also very refractory. When it is tapped from the furnace it may be cast into molds. It is possible to vary its qualities such as hardness and toughness, by varying the ratio of silica and alumina, and I have found that these valuable properties are possessed by the material while its silica content varies between five and thirty-five per cent. Basic and other impurities are substantially absent.

I claim:—

1. The herein described method of treating aluminum silicate, which consists in mixing with it an amount of carbon insufficient to reduce all the silicon, and subjecting the mixture to electrically developed heat sufficient to reduce a portion of the silicon and to fuse the alumina-silica residuum into a hard refractory abrasive material.

2. The herein described method of treating aluminum silicate, which consists in mixing with it an amount of carbon insufficient to reduce all the silicon, subjecting the mixture to electrically developed heat sufficient to reduce a portion of the silicon and to fuse the alumina-silica residuum into a hard refractory abrasive material, and separating the silicon from the alumina-silica material.

3. The herein described method of treating aluminum silicate, which consists in making a mixture of aluminum silicate, carbon, and base metalliferous material, the amount of carbon being insufficient to reduce all the silicon, subjecting said mixture to electrically developed heat sufficient to reduce a portion of the silicon and combine it with the base metal, the amount of said silicon reduced being determined by the amount of carbon present, and to fuse the alumina-silica residuum.

4. The herein described method of treating aluminum silicate, which consists in making a mixture of aluminum silicate, carbon, and base metalliferous material, the amount of carbon being insufficient to reduce all the silicon, subjecting said mixture to electrically developed heat sufficient to reduce a portion of the silicon and combine it with the base metal, the amount of said silicon reduced being determined by the amount of carbon present, to fuse the alumina-silica residuum, and allowing the products to cool and then separating the products.

5. The herein described method of treating aluminum silicate, which consists in making a mixture of aluminum silicate, carbon, and base metalliferous material, the amount of carbon being insufficient to reduce all the silicon, subjecting said mixture to electrically developed heat sufficient to reduce a portion of the silicon and combine it with the base metal, the amount of said silicon reduced being determined by the amount of carbon present, and to fuse the alumina silica residuum, tapping the products from the furnace, allowing them to cool, and separating them.

6. The herein described method of treating aluminum silicate, which consists in making a mixture of aluminum silicate, carbon, and base metalliferous material, the amount of carbon being insufficient to reduce all the silicon, subjecting said mixture to electrically developed heat sufficient to reduce a portion of the silicon and combine it with the base metal, the amount of said silicon reduced being determined by the amount of carbon present, and to fuse the alumina-silica residuum, tapping the said residuum from the furnace and casting it in molds.

7. The herein described method of treating aluminum silicate, which consists in making a mixture of aluminum silicate, carbon, and base metalliferous material, the amount of carbon being insufficient to reduce all the silicon, and the amount of base metalliferous material being sufficient to form a disintegrating alloy with the reduced silicon, and subjecting said mixture to electrically developed heat sufficient to reduce a portion of the silicon and combine it with the base metal and to fuse the alumina-silica residuum.

In testimony whereof, I have hereunto set my hand.

FRANK J. TONE.

Witnesses:
FRED I. PIERCE,
CHARLES CHORMANN.